US006931791B1

(12) United States Patent
Pleiss

(10) Patent No.: US 6,931,791 B1
(45) Date of Patent: Aug. 23, 2005

(54) SYSTEM TO BE FITTED IN A VEHICLE DOOR

(75) Inventor: Eberhard Pleiss, Schwaigern (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 10/049,223

(22) PCT Filed: Jul. 22, 1999

(86) PCT No.: PCT/DE99/02285
§ 371 (c)(1),
(2), (4) Date: Jan. 18, 2002

(87) PCT Pub. No.: WO01/07277
PCT Pub. Date: Feb. 1, 2001

(51) Int. Cl.[7] ................................................ B60J 5/04
(52) U.S. Cl. .......................................... 49/502; 49/352
(58) Field of Search .......................... 49/348, 349, 352, 49/502; 296/146.5, 146.7

(56) References Cited

U.S. PATENT DOCUMENTS

| 4,785,585 A | * | 11/1988 | Grier et al. ................... 49/502 |
| 5,548,930 A | * | 8/1996 | Morando ...................... 49/502 |
| 5,924,245 A | * | 7/1999 | Manuel et al. ................ 49/352 |
| 5,927,020 A | * | 7/1999 | Kobrehel ...................... 49/502 |
| 5,979,115 A | | 11/1999 | Szerdahelyi et al. .......... 49/502 |
| 6,185,872 B1 | | 2/2001 | Seeberger et al. |
| 6,233,875 B1 | * | 5/2001 | Carlo et al. ................... 49/502 |
| 6,301,835 B1 | * | 10/2001 | Pfeiffer et al. ................ 49/502 |
| 6,354,652 B1 | * | 3/2002 | Arquevaux et al. ....... 296/146.5 |
| 6,438,899 B1 | * | 8/2002 | Feder et al. ................... 49/502 |
| 6,449,907 B2 | * | 9/2002 | Nishikawa et al. ........... 49/502 |
| 6,516,493 B1 | * | 2/2003 | Seliger et al. ............... 16/96 R |
| 6,526,696 B2 | * | 3/2003 | Cardine ...................... 49/227 |

FOREIGN PATENT DOCUMENTS

| DE | 32 01 740 | 7/1983 |
| DE | 195 13 850 | 3/1996 |
| DE | 195 11 294 | 10/1996 |
| DE | 195 11 105 | 11/1996 |
| DE | 195 09 282 A 1 | 11/1996 |
| DE | 197 47 709 | 5/1999 |
| DE | 198 02 477 | 8/1999 |
| DE | 198 38 347 | 2/2000 |
| EP | 0 427 152 | 5/1991 |
| EP | 0 563 742 | 10/1993 |
| EP | 0 579 535 | 1/1994 |
| EP | 0 794 076 | 9/1997 |
| GB | 2 250 534 | 6/1992 |

OTHER PUBLICATIONS

English translation of International Preliminary Examination Report dated May 16, 2001 corresponding to International application PCT/DE99/02285.

* cited by examiner

Primary Examiner—Jerry Redman
(74) Attorney, Agent, or Firm—Christie, Parker & Hale, LLP

(57) ABSTRACT

A system to be fitted into a vehicle door which includes a window lifter for lifting and lowering a window pane of the vehicle door and includes a drive unit and a mechanism for transferring drive force from the drive unit to the window pane, and a closing mechanism for closing and opening the vehicle door wherein the window lifter and the closing mechanism are provided for fixing on a supporting plate of the vehicle door. At least one part of the closing mechanism forms with a structural group of the window lifter a preassembled structural unit which is provided for fixing on the supporting plate of the vehicle door.

18 Claims, 5 Drawing Sheets

SYSTEM TO BE FITTED IN A VEHICLE DOOR

CROSS-REFERENCE TO RELATED APPLICATION

This application is a National Stage application in the U.S. based on International Application No. PCT/DE99/02285 filed Jul. 22, 1999.

FIELD OF THE INVENTION

The invention relates to a system to be fitted in a vehicle door having a window lifter for lifting and lowering a window pane of the vehicle door and a closing mechanism for closing and opening the vehicle door.

BACKGROUND OF INVENTION

From DE 195 11 294 A1 a vehicle door is known which has a door inside panel, a door outside panel and a door window frame as well as a window pane which can be moved up and down and which is guided in a window pane guide of the door window frame. This motor vehicle door furthermore has a door lock, an operating device for the door lock, a door outside handle for the operating device and a window lifter. The door lock and a socket part for the door outside handle are combined by means of a supporting element into one installation module and the door inside panel and the door outside panel are set up for introducing and mounting this installation module. A multi-function part mounted in the installation module has a support plate for the door lock and the door lock fixed thereon, as well as an extension component of the window pane guide and a connecting part to which the socket part for the door outside handle is connected.

By means of the installation module described in DE 195 11 294 A1 it is possible to simplify the installation of a door lock into a vehicle door since parts of the door lock and the associated operating device can be pre-assembled outside of the door and then inserted as one complete unit into same.

SUMMARY OF THE INVENTION

The object of the invention is to improve and simplify the assembly of a vehicle door still further.

This is achieved by providing a system to be fitted into a vehicle door wherein at least a part of the closing mechanism of the vehicle door forms with a structural group of the window lifter one pre-fabricated modular unit which is provided for fixing on a supporting plate of the vehicle door.

Unlike the technical instruction of DE 195 11 294 A1 which deals with the integration of different components of the closing mechanism of the vehicle door into one uniform installation module (which still only includes a part of the window guide near which the door lock is normally situated), with the present invention there is integration of two quite different closing mechanisms of a motor vehicle, namely on the one hand a closing mechanism for closing and opening the vehicle door and on the other hand a closing mechanism for opening and closing the window pane. The degree of integration of the components in the region of the vehicle door is further increased which allows an easier, faster, more reliable and more cost-effective assembly of the vehicle door.

By structural groups of a window lifter are meant here the drive unit of the window lifter as well as the means for transferring the drive force from this drive unit to the window pane (such as e.g. gearing elements, draw means and guide rail in the case of a cable window lifter etc), but not however lateral guide elements for guiding the edges of the window pane which are independent of the window lifter.

The installation module which is formed by the closing mechanism of the vehicle door (or a part thereof) and at least one structural group of the window lifter is provided for mounting on a supporting plate of the vehicle door, in particular the door inner panel or door module support; the door module support is regarded as the large-surface support plate for a door module which is fitted on a cut-out section provided for this purpose in a vehicle door and supports a number of functional components of a vehicle door, such as for example the closing mechanism, the window lifters, a side air bag, speakers and the like. It is essential that the installation module which is formed according to the present invention constitutes a part of the closing mechanism of the vehicle door and at least one structural group of the window lifter independently of the plate supporting same. Thus with the present invention it is a matter of combining a part of the closing mechanism of the vehicle door as well as at least one structural group of the window lifter directly into one structural unit which is only then fixed on a supporting plate of the vehicle door. Not to be included therefore are those known systems where a window lifter and a closing mechanism for a vehicle door are first integrated into a module by mounting the corresponding parts on a large-surface support plate of the vehicle door which is neither a constituent part of the window lifter nor a constituent part of the closing mechanism of the vehicle door.

In a preferred embodiment of the invention at least one supporting component part of the window lifter, such as for example a guide rail of a cable window lifter or a base plate of the drive unit of the window lifter, forms a preassembled structural unit with at least one supporting component part of the closing mechanism, such as for example a socket for the door lock. These two supporting component parts can thereby be connected together both through additional connecting means and also integrally.

According to another embodiment of the invention at least one supporting component part of the window lifter, such as for example the aforementioned guide rail or base plate serves at the same time to house a functional element of the closing mechanism, such as for example a door lock or door outside handle.

It is important that with the aforementioned supporting component parts of the window lifter or closing mechanism of the vehicle they are each supporting component parts which are specially designed for holding the parts of the window lifter or closing mechanism and therefore accordingly form a constituent part of the window lifter or closing mechanism.

A further increase in the degree of integration in the region of the vehicle door is reached if the guide rail of the window lifter and a base plate provided for housing the drive unit of the window lifter also form one preassembled structural unit and more particularly are connected together in one piece. Parts of the closing mechanism of the vehicle door can then be combined with this structural unit into one installation module. Alternatively however the drive unit and guide rail of the window lifter can also be separate independent structural groups of which one is provided for forming a structural unit with parts of the closing mechanism of the vehicle door.

Suitable as parts of the closing mechanism of the vehicle door which can be combined with a structural group of the window lifter to form one structural unit are in particular a socket for a door lock, the door lock itself, a socket for a door outside handle, the door outside handle itself, a socket for a door inside handle and the door inside handle itself; furthermore operating elements through which the door inside handle or the door outside handle are coupled to the door lock in order that the vehicle door (not locked) can be opened from inside or outside of the vehicle. Which of these components are to be included in making up a structural unit depends on the relevant conditions each time inside a vehicle door.

By socket for the door lock or the door outside handle or the door inside handle is meant here any component part or structural groups which serve as supporting component parts specially for housing the door lock, the door outside handle or the door inside handle. This can be both a flat surface support element on which one of the said function elements is fixed, where necessary through a further holder, and also one such holder, such as for example a door outside handle holder. The terms door outside handle and door inside handle are to include both a simple pull-to handle and a door opener as well as a combination of these elements.

In a preferred embodiment the socket for the door lock forms a preassembled structural unit with the base plate for the drive unit of the window lifter, wherein these two parts can be connected together in one piece, or also a conventional base plate for a drive unit can be simply provided with additional fastening sites for a door lock. This embodiment of the invention can be used both for those cases where the base plate for the drive unit additionally constitutes a structural unit with the guide rail of the window lifter, and also in cases where a separate base plate is used.

Particularly in the case of a so-called outside window lifter which is mounted between the door outside panel and the window pane it is advantageous that at least the socket for the door outside handle forms a preassembled structural unit with the guide rail of the window lifter and thereby extends in the direction of the end on the B-pillar side (in the case of driver and front passenger doors) or the end on the C-pillar side (in the case of rear doors) of the vehicle door.

With a so-called inside window lifter where the window pane is mounted between the door outside panel and the window lifter, the socket for the door inside handle preferably forms a preassembled structural unit with the guide rail and extends in the direction of the end on the A-pillar side (in the case of driver or front passenger doors) or end on the B-pillar side (in the case of rear doors) of the vehicle door.

In the case of a double-strand cable window lifter having two guide rails running side by side both a support for the door lock and also a socket for the door outside handle are preferably combined as one preassembled structural unit with the guide rail of the window lifter on the B-pillar side.

In further preferred arrangements a support for the door lock is connected to the socket for the door outside handle and the socket for the door outside handle is additionally connected to the guide rail, or the door lock and door outside handle holder are fixed on the guide rail through a common support.

With the aforementioned embodiments the associated functional element of the closing mechanism, such as for example the door lock, the door outside handle or the door inside handle, are each advantageously pre-fitted on the said socket elements. The corresponding structural unit comprising the parts of the window lifter and the parts of the locking mechanism of the vehicle door then not only includes the supporting component parts of the closing mechanism, but also the associated functional elements, such as for example the door lock, door inside handle or the door outside handle.

According to a preferred embodiment of the invention it is further proposed that the guide rail of the window lifter is designed for displaceable mounting on the supporting plate of the vehicle door, namely is displaceable in particular along the longitudinal direction of the vehicle. This embodiment is then particularly advantageous if the supporting plate is a support plate for a door module which is completely pre-assembled independent of the vehicle door and is then inserted as such into the vehicle door. The guide rail of the window lifter can then be moved (together with any parts of the closing mechanism of the vehicle door which may be fixed thereon) between a transport and assembly position on the support plate and an operating position on the support plate wherein the last-mentioned operating position is only occupied after installation of the support plate in the vehicle door in order that the guide rail and the parts of the closing mechanism of the vehicle door connected therewith can be transferred into their operating position inside the vehicle door where they are then fixed.

In addition the supporting plate of the vehicle door preferably defines a recess which makes it easier to assemble the closing mechanism, e.g. since the support plate only partially covers a large-surface cut-out section in the door inside panel.

DETAILED DESCRIPTION

Further advantages of the invention will now be explained with reference to the following description of an embodiment shown in the drawings in which.

Figure 3:
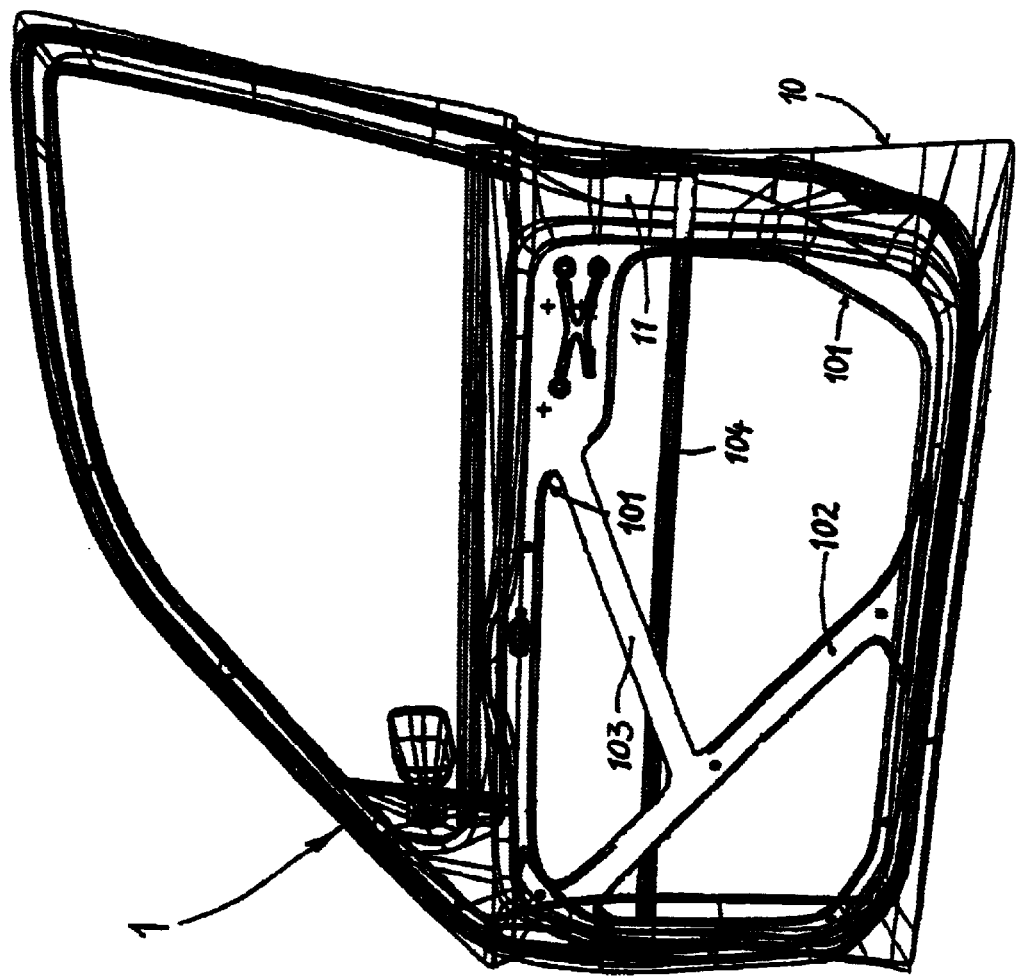
FIG. 3 shows a side view of a door body having a large area cut-out section in the door inside panel for fitting a support plate according to FIG. 1.

FIG. 3 shows a door body 1 having a large area cut-out section 101 in the door inside panel 11 which is crossed by stays 102, 103 for increasing the rigidity of the door body 1. An additional reinforcement element 104 serves as a side driver protection. The large area cut-out section 101 is particularly suited for fitting out the vehicle door with a so-called door module, whose support plate 2 covers at least partially the cut-out section 101 and supports the essential functional components of the vehicle door.

Figure 1:
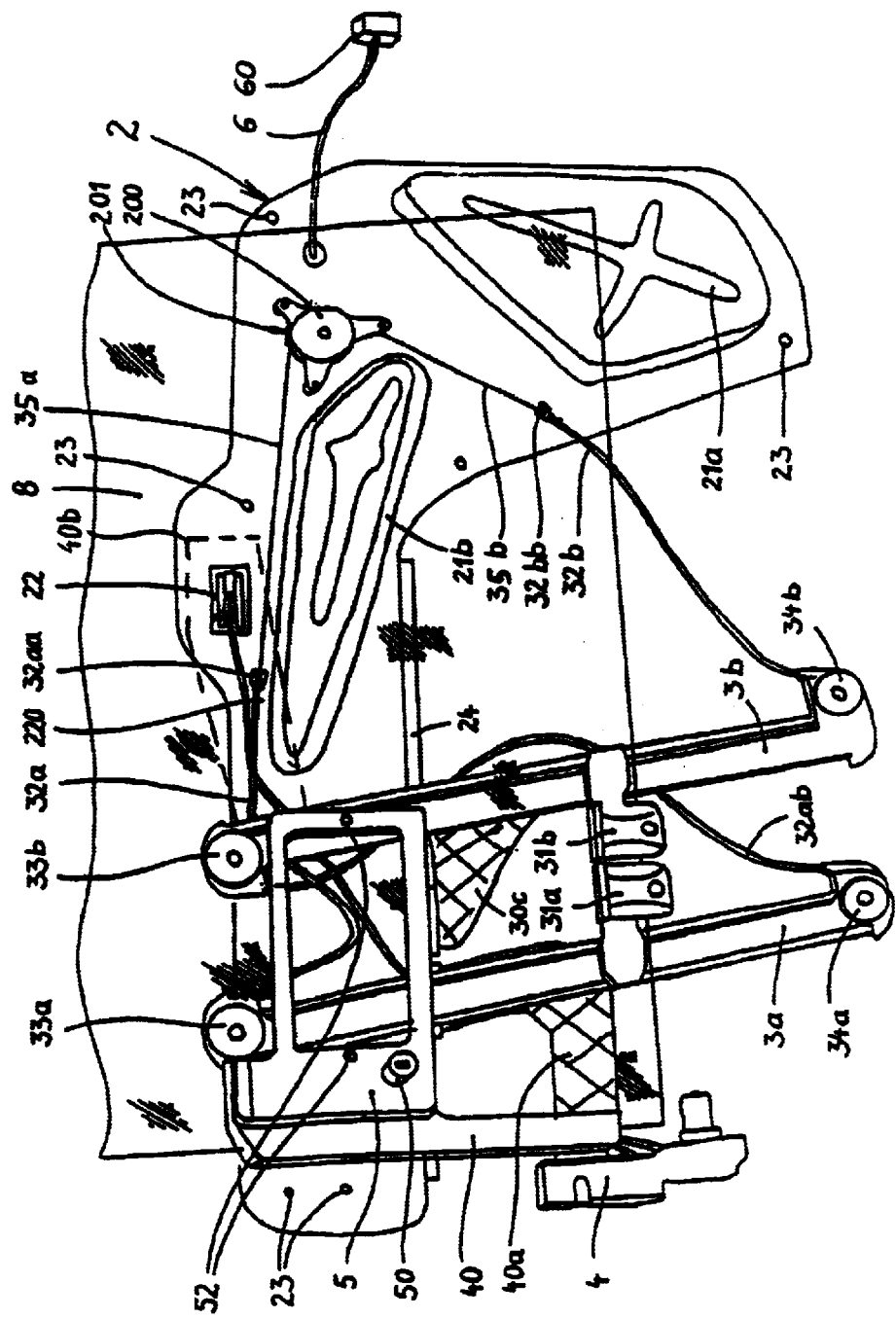
FIG. 1 is a side view of the wet space side of a support plate with pre-fitted functional components prior to installation into the door body.

FIG. 1 shows a door module which is fitted out inter alia with a double-strand Bowden cable window lifter and a lock 4 as well as with further parts of the closing mechanism of the vehicle door. A better view of the construction according to the invention can be gained from the diagrammatic cross-sectional view in FIG. 2 which shows the essential structural elements of the door module independently of their actual position in the vehicle door.

The lower horizontal edge of the support plate 2 is fitted with a rail 24 into which tight-fitting slide members of the metal guide rails 3a, 3b of the double-strand Bowden cable window lifter engage so that the guide rails 3a, 3b can be displaced. Whilst the A-pillar side guide rail 3b facing the drive unit 200, 201 of the window lifter is supported on the rail 24 through a support 30c the other B-pillar side guide rail 3a is connected displaceable with the support plate 2 through another support 40a wherein the lock 4 and a further support 40 which in turn supports an outside handle holder 5 are fixed on the said support 40a.

Since the displaceable guide rail 3a is connected to the door lock 4 and to the door outside handle holder 5 through specially designed supports 40a, 40, when the displaceable guide rail passes into the operating position the lock 4 and the outside handle holder 5 also move into their ideal positions without these components having to be positioned separately. In the case of a double-strand Bowden cable window lifter the B-pillar side guide rail 3a (in the case of a driver or front passenger door) or the C-pillar guide rail (not shown) (in the case of rear doors) is connected to the outside handle holder 5 and/or the door lock 4.

If a comparatively large displacement path is required in order to bring the guide rails of a double-strand Bowden cable window lifter into their operating position, and in particular if this is connected with the need to likewise displace a drive unit which is mounted between the guide rails, then the drive unit containing the cable drum should be mounted outside of the interspace between the guide rails. In the case of this type of design the drive unit 200, 201 can be mounted rigid on the support plate 2. In order to reduce the cable friction forces it is advantageous to equip the guide rail 3b facing the drive unit with one cable exit which faces the drive unit and one cable exit which faces the other guide rail. This prevents the Bowden cable from bending. This will be explained in further detail below.

The closing cylinder 50 of the lock 4 is pre-fitted on the outside handle holder 5; fixing points 52 of the outside handle holder 5 serve to connect the outside handle of the vehicle door.

Figure 2:
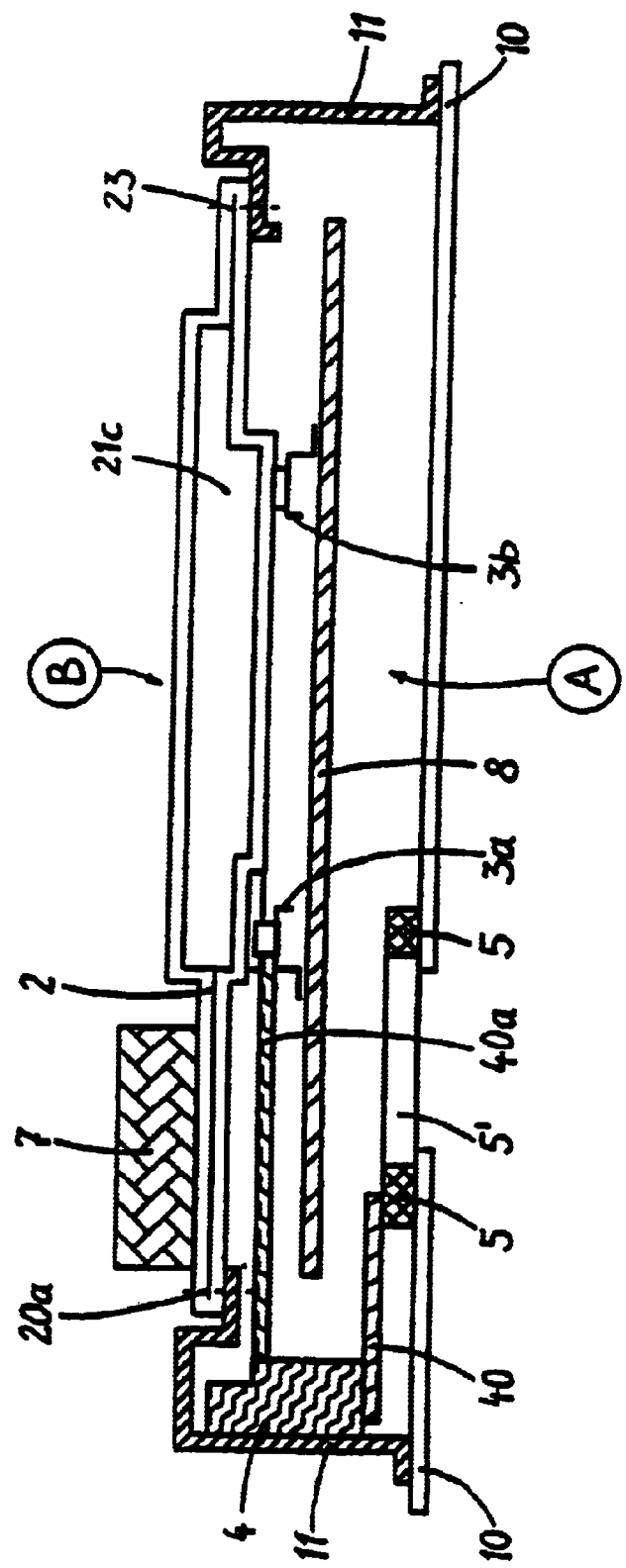
FIG. 2 is a diagrammatic cross-sectional view through a vehicle door which is provided with a support plate according to FIG. 1.

The illustrations in FIGS. 1 and 2 show the functional positions of the window lifter and lock 4. In the transport and assembly position (not shown) the guide rails 3a, 3b and the functional components of the closing mechanism of the vehicle door (lock 4 and outside handle holder 5) connected to the guide rails are displaced in the direction of the drive unit 200, 201 until it becomes no problem to fit the window lifter and lock 4. Only after the support plate 2 is fixed on the door inside panel 11 is the guide rail 3a moved together with the lock 4 into the operating position so that the lock 4 can also be fixed in the proposed site on the door body.

In order to connect the window pane 8 to the window lifter, followers 31a, 31b are provided on each guide rail 3a, 3b where they are fixedly connected to the cable loop and can be raised and lowered along the guide rails 3a, 3b when the window lifter is operated.

A cable drum housing 200 with cable drum 201 mounted therein form constituent parts of the drive system of the window lifter which is mounted on the support plate 2 outside of the interspace between the guide rails 3a, 3b. The cable sections 35a, 35b emerging therefrom extend in a straight line and without being encased by a Bowden cable up to the Bowden cable supports 32aa, 32bb supported on the support plate 2. All further cable sections which extend from the cable exits in the region of the guide pulleys 33a, 33b, 34a, 34b are guided in Bowden cables 32a, 32b, 32ab and thus ensure the freedom of movement of the two guide rails 3a, 3b.

Accordingly one region 35a, 35b of the cable emerging from the drive unit 200, 201 of the window lifter is designed without Bowden cable and one region 32a, 32b adjoining same up to the guide rail is designed with Bowden cable whereby the end of the Bowden cable pointing away from the guide rail 3b is equipped with Bowden cable supports 32aa, 32bb provided on the support plate 2. Between the Bowden cable support 32aa, 32bb and the cable exit of the drive 200,201 the cable extends analogous with a cable window lifter over a direct straight path. Thus a Bowden cable window lifter is provided locally variable on the support plate and with its cable loop encased only in part by a Bowden cable between the cable exits of the drive 200, 201 and guide rail 35.

In order to minimize bending in the Bowden cables and thus to minimize the friction losses the cable exits in the pulley areas of the guide rail 3a facing the drive unit 200, 201 are directed opposite one another whereby the cable exit connected through the Bowden cable 32b to the cable drum 201 faces the drive unit whilst the other cable exit faces the guide rail 3b and is connected directly to its lower cable exit through the Bowden cable 32ab. The cable loop and thus the force flow in the window lifter is closed by means of a Bowden cable 32a between the upper cable exit of the guide rail 3a and the cable drum 201.

The support plate 2 which is selected for this embodiment takes the form of a double-walled plastics part which was manufactured using blow moulding technology. In order to reinforce the support plate 2 reinforcement areas 21a, 21b are provided in which the two walls are connected together. One or more hollow cavities can serve to house mechanical or electrical components or to convey cables and rod linkages. Furthermore a closed hollow cavity can also function as a resonance chamber for a speaker. Fixing points 23 serve to fit the support plate 2 on the door inside trim 11. The electrical components of the door module are supplied with energy through a cable 6 and plug connection 60.

A handle shell 22 is integrated in the upper region of the support plate 2 and a door opener (door inside handle) is mounted therein; the operating force is passed on to the lock 4 through a Bowden cable 220. Alternatively the handle shell 22 could be mounted according to the present invention on a separate support which is connected to the guide rail 3b on the A-pillar side and points towards the drive unit 200, 201, forming with the guide rail a preassembled unit (corresponding to the supports 40, 40a for the door lock and outside door holder). The contour of a corresponding support 40b (which would extend in front of the dry space side B of the window pane 8—in respect of FIG. 2) is indicated by chain-dotted lines in FIG. 1.

On the dry space side B the support plate 2 also supports a side airbag 7 which when needed unfolds through an ideal break point in the door inside trim (not shown).

Since the support plate 2 only partially covers the cut-out section 101 (FIG. 3) in the door inside panel 11 (FIG. 3) it is necessary in order to separate the wet space A and dry space B to cover at least the remaining area through suitable means. This can be achieved for example by sticking on a suitably sized foil.

Figure 4:
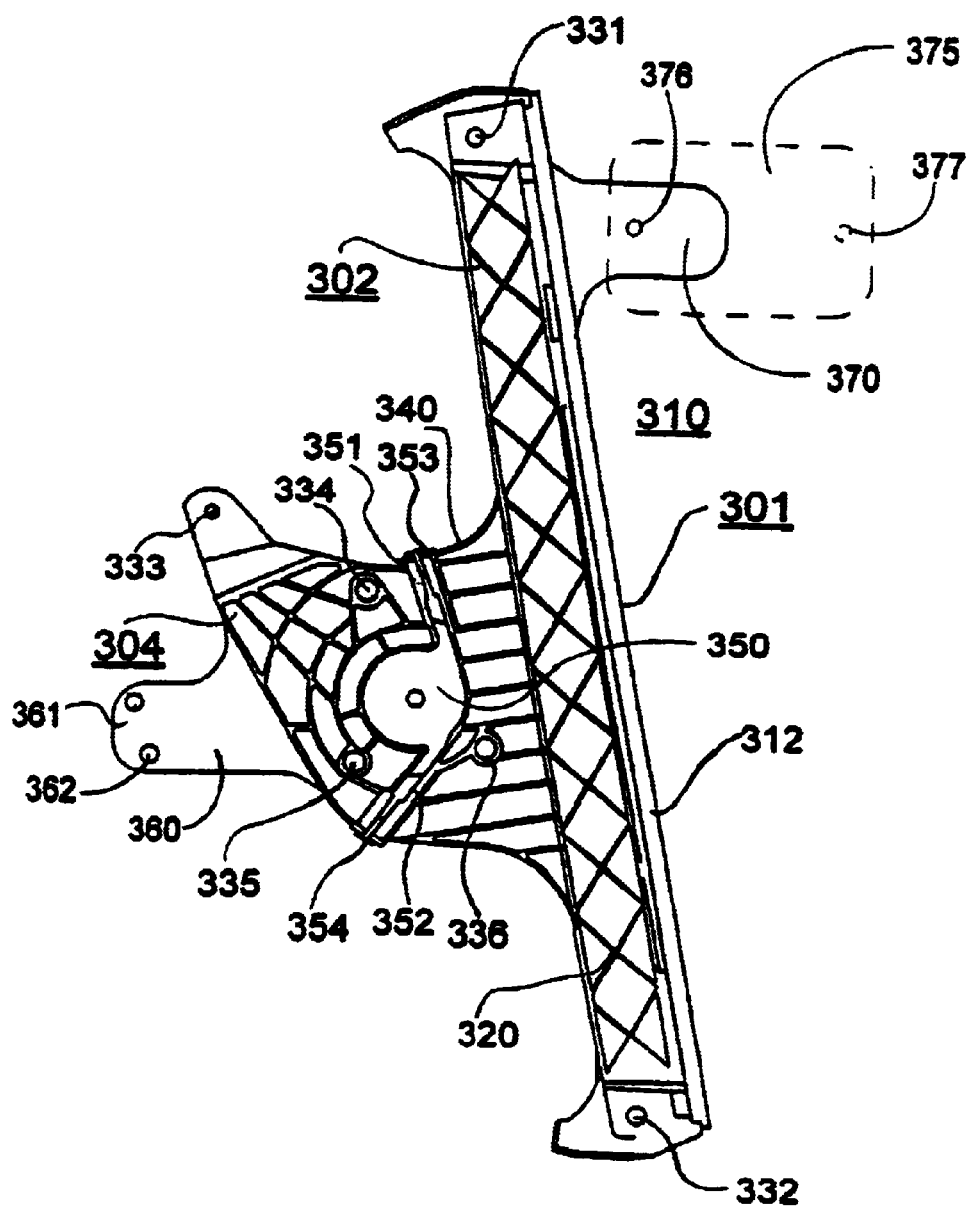
FIG. 4 shows a plan view of a guide rail for a cable window lifter on which are formed a support plate for a door lock as well as a support plate for a door inside handle holder.

The guide rail 310 illustrated in plan view in FIG. 4 and having an integral moulded bearing site 304 in the form of a base plate for a cable roller and with connecting points 334 to 336 for a window lifter drive or a bearing cover for a drive or gear housing consists preferably of plastics or a metal profiled section injection moulded in part with plastics. The guide rail 310 is divided into a guide area 301 and a reinforcement area 302 and has two fixing points 331, 332 where it is connected to a fixing base of a vehicle door, by way of example to a support plate or door inside panel.

The guide area 301 has a slide face 312 for receiving a window pane follower or slider which slides along in the longitudinal direction of the guide rail 310 on the slide face engaging with keyed engagement around the same.

The reinforcement area 302 has reinforcement elements 320 in the form of ribs or webs which protrude at right angles from the surface of the reinforcement area 302 and form a waffle pattern or crisscross ribbing. The slide face 312 is not in direct connection with the reinforcement elements 320 of the reinforcement areas 302 since an additional web is mounted between the guide area 301 and the reinforcement area 302 and connects the two areas together in one piece.

The bearing site 304 adjoining the reinforcement area 302 and serving as a base plate for the drive and gear elements of the window lifter has a plurality of ribs or webs 340 protruding perpendicularly from the base surface of the bearing site 304 and arranged partly as rays around connecting points 334 to 336 for a window lifter drive, a bearing cover of a gear housing or the like, thereby ensuring optimum force transfer to the reinforcement area 302. In the same way parallel aligned ribs or webs serve to increase the structural strength of the guide rail 310.

The bearing site 304 has a hollow cylindrical inside chamber 350 as part of a drive housing from which two insert channels 351, 352 extend for a drive cable whose Bowden sleeve is connected at Bowden supports 353, 354 to the drive housing. The drive cable is each time connected through an upper and lower pulley in the region of the fixing points 331, 332 to the follower which is guided displaceable on the guide area 301. A cable drum is inserted in the hollow cylindrical inside chamber 350 of the drive housing and its cylindrical outside surface is provided with cable guides for holding the drive cable.

A further fixing point 333 serves for connecting the bearing site 304 or for additionally supporting the guide rail 310 on the fixing base of the vehicle door, i.e. on a support plate, a door inside panel or a door module in which the guide rail 310 can be integrated when necessary.

Furthermore a socket in the form of a support 360 with fixing points 361, 362 for a door lock is moulded on the bearing site 304 which is formed as a bearing plate. The support 360 is—as is usual in the case of lock holders—formed sufficiently elastic so that the door lock prefitted on the support 360 can be additionally fixed on a supporting part of the vehicle body and manufacturing tolerances can be compensated. Alternatively a movable connection between the support 360 and the door lock can also be provided whereby mobility in the longitudinal direction of the vehicle is particularly important. Furthermore the integration of a lock holder into a base plate for a drive can also be undertaken in the case of a separate base plate which is independent of the guide rail of the window lifter.

The upper end of the guide rail is provided with a socket 370, 375 for a door inside handle, the socket consisting of a support 370 moulded on the guide rail 310, as well as a door inside handle holder 375 connected thereto and having fixing points 376, 377 for a door inside handle. The support 370 is hereby moulded on the guide rail 310 so that the connecting area between the guide rail and support does not impede the movement of a follower along the slide face 312. Alternatively the support 370 can also be formed as a separate structural element fixed on the guide rail 310.

The chain-dotted illustration of the door inside handle holder 375 is to show that this is an optional constituent part of the preassembled structural unit comprising guide rail 310 and supporting component parts 360, 370, 375 of the closing mechanism of the vehicle door. On the other hand further elements of the closing mechanism, such as e.g. the door lock or the door inside handle itself can still be prefitted on the corresponding sockets. The door inside handle serves for opening the vehicle door from inside the vehicle and is for this purpose connected to the door lock through a suitable operating rod linkage.

A guide rail 310 of this kind having preassembled sockets for the door lock and door inside handle is particularly suitable for use in a so-called internal window lifter wherein the window pane runs between the door outside panel and the window lifter mechanism (guide rail etc).

It should still be pointed out that FIG. 4 shows a view of the guide rail 310 from outside of the vehicle. I.e. when installing this guide rail 310 in a vehicle door 1 according to FIG. 3 (by using a support plate covering the cut-out section 101) the socket for the door lock would point towards the rear end (B-pillar side) of the vehicle door whilst the socket for the door inside handle would point towards the front end (A-pillar side) of the vehicle door.

The guide rail can be manufactured optionally completely or in part of plastics. By dividing the guide rail into a guide area and a reinforcement area there is a choice of a dual or multi component injection moulding process in which the reinforcement area consists of a material of high strength and high E-modulus and a tribologically favourable material is chosen for the guide area which is better for lower friction values, reduced wear and low noise level.

In an alternative embodiment the reinforcement area of the guide rail can also be made from a metal profiled section having favourable mechanical properties which ensures a high resistance moment with a relatively light weight whilst the guide area is made from plastics owing to the better tribological properties. Both areas can be connected together with positive and/or force-locking engagement, for example by injecting plastics around the metal profiled section which in addition to helping with the guide function also helps to further strengthen the metal profiled section since a hybrid structure is produced through ribs and reinforcements which is both bending-resistant and torsionally rigid.

Regarding further details relating to the (at least partial) fabrication of a guide rail from plastics reference is made to the German Patent Application 198 38 347.

Figure 5:
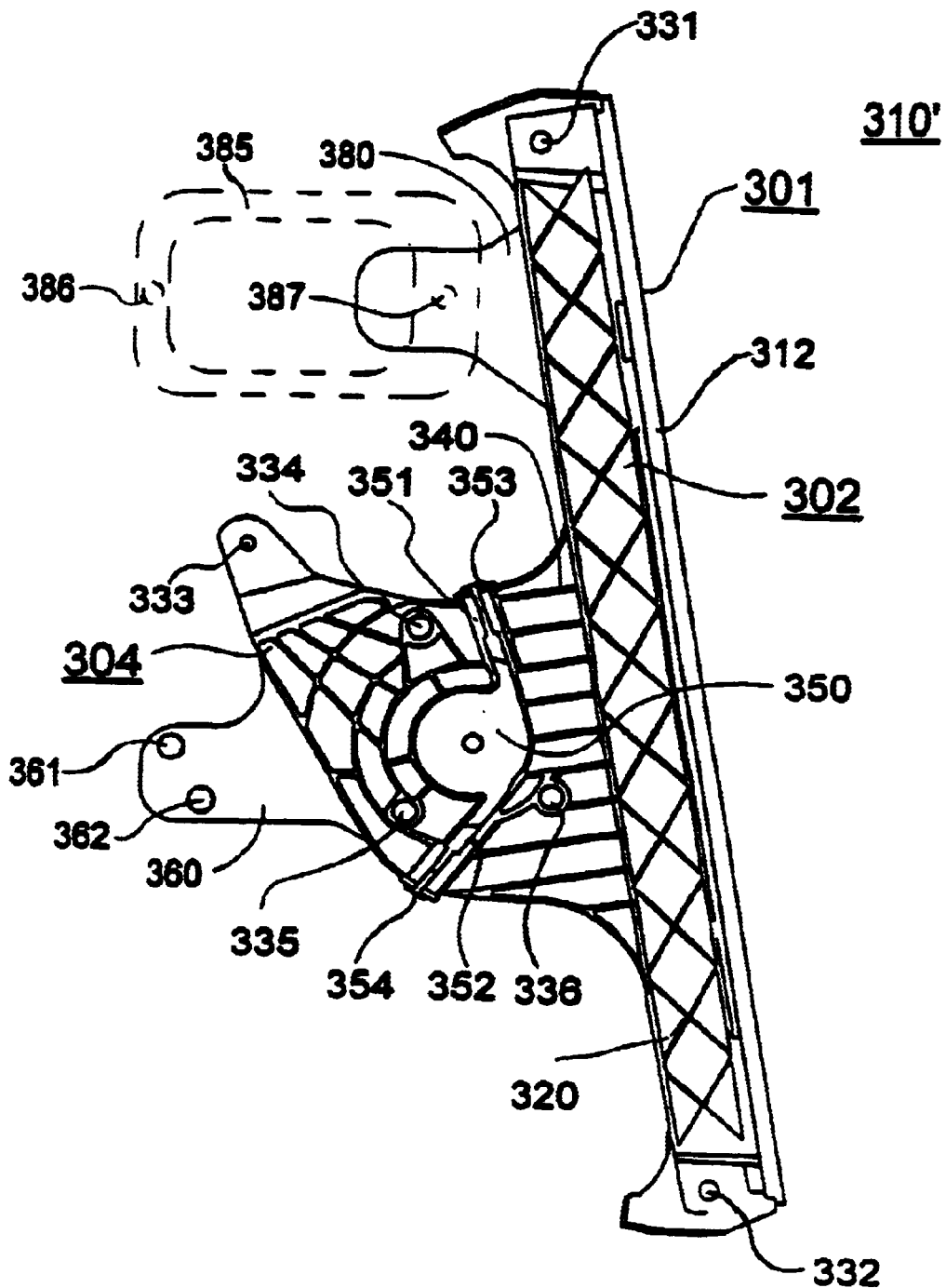
FIG. 5 shows a plan view of a guide rail for a cable window lifter on which are formed a support plate for a door lock as well as a support plate for a door outside handle holder.

FIG. 5 shows a modification of the embodiment of FIG. 4 with the single difference being that the guide rail 310' according to FIG. 5 has instead of a socket for a door inside handle a socket 380, 385 for a door outside handle, with the socket consisting of a support 380 moulded in the upper area of the guide rail 310' and of a door outside handle holder 385 fixed thereon with fastening points 386, 387 for a door outside handle and pointing towards the rear end (B-pillar side) of a vehicle door (see FIG. 3).

The guide rail 310' illustrated in FIG. 5 with preassembled sockets for the door lock and door outside handle is particularly suitable for use with a so-called outside window lifter where the window lifter mechanism (guide rail etc) runs between the door outside panel and the window pane.

Obviously however an individual guide rail can also be provided both with a socket for a door inside handle and with a socket for a door outside handle. It would hereby be necessary (depending on whether it concerns an inside or outside window lifter) to guide one of the two sockets to the side of the window pane remote from the guide rail, as illustrated for example in FIG. 2 using the support 40 for the door outside handle holder 5, which is mounted on the side of the window pane 8 remote from the guide rails 3a, 3b.

What is claimed is:

1. A system to be fitted into a vehicle door comprising:
   a window lifter for lifting and lowering a window pane of said vehicle door including a drive unit, a transfer mechanism for transferring drive force from the drive unit to the window pane, and a guide rail of the transfer mechanism along which a follower of the window pane is guided, and
   a closing mechanism for closing and opening the vehicle door,
   wherein the window lifter and the closing mechanism are fixed on a supporting plate of the vehicle door,
   wherein at least one supporting part of the closing mechanism contacts and is fixed relative to the guide rail, the guide rail consisting at least in part of plastics, and
   wherein the guide rail of the window lifter is slidably displaceable on the supporting plate between a first position and an operating position.

2. The system according to claim 1 wherein at least one supporting structural part of the window lifter serves at the same time to hold a functional element of the closing mechanism.

3. The system according to any of claims 1 or 2 wherein at least a part of the closing mechanism forms a prefabricated structural unit with the drive unit of the window lifter.

4. The system according to claim 3 wherein a base plate for holding the drive unit forms a prefabricated structural unit with the guide rail.

5. The system according to claim 4 wherein the base plate is in one piece with the guide rail.

6. The system according to claim 3, further comprising a socket for a door outside handle, the socket forming a prefabricated structural unit with the guide rail, wherein the window lifter is an outer window lifter.

7. The system according to claim 3 further comprising a socket for a door inside handle, the socket forming a prefabricated structural unit with the guide rail wherein the window lifter is an inner window lifter.

8. The system according to claim 3 wherein the window lifter is formed as a double-strand cable window lifter having a second guide rails running side by side with the guide rail and wherein a socket for a door lock and a socket for a door outside handle form a prefabricated structural unit with one of the guide rail and the second guide rail that is on a B-pillar side.

9. The system according to claim 3 wherein a socket for a door lock is connected to a socket for a door outside handle and the socket for the door outside handle is connected additionally to the guide rail.

10. The system according to claim 3 wherein a door lock and a door outside handle holder are fixed on the guide rail through a common support.

11. The system according to claim 3 wherein the guide rail is displaceable on the supporting plate along a longitudinal direction of the vehicle.

12. The system according to claim 2, wherein at least a part of the closing mechanism, forms a prefabricated structural unit with the drive unit of the window lifter,
    wherein a base plate for holding the drive unit forms a prefabricated structural unit with the guide rail,
    wherein the base plate is moulded in one piece on the guide rail, and
    wherein the functional element of the closing mechanism is prefitted on an associated holding element.

13. The system according to claim 1 wherein a part of the closing mechanism which forms a structural unit with a structural group of the window lifter comprises at least one of the group of structural elements consisting of:
    a socket for a door lock,
    the door lock,
    a socket for a door outside handle,
    the door outside handle,
    a socket for a door inside handle, and
    the door inside handle.

14. The system according to claim 13 wherein the part of the closing mechanism that forms a structural unit is the socket for the door lock and wherein the socket for the door lock forms a prefabricated structural unit with a base plate for the drive unit.

15. The system according to claim 1 wherein the supporting plate of the vehicle door is formed as one of a door inside panel and a large surface support plate for a door module which is fitted onto a corresponding cut-out section in the door inside panel.

16. The system according to claim 1 wherein the supporting plate defines a recess for assembly of the closing mechanism.

17. A system to be fitted into a vehicle door comprising:
    a window lifter for lifting and lowering a window pane of said vehicle door including a drive unit, a transfer mechanism for transferring drive force from the drive unit to the window pane, and a guide rail of the transfer mechanism along which a follower of the window pane is guided, and
    a closing mechanism for closing and opening the vehicle door, the closing mechanism having at least one supporting part and an exposed part, the exposed part located at least in part on an outside of said vehicle door, and the supporting part connected to and supporting the exposed part,
    wherein the window lifter and the closing mechanism are fixed on a supporting plate of the vehicle door,
    wherein the at least one supporting part of the closing mechanism is contacting and fixed relative to the guide rail, the guide rail consisting at least in part of plastics, and
    wherein the guide rail of the window lifter is slidably displaceable on the supporting plate between a first and an operating position.

18. A vehicle door comprising:
    a window pane;
    a window lifter including a drive unit, a transfer mechanism for transferring drive force from the drive unit to the window pane, and a first and a second guide rail of the transfer mechanism along which a follower of the window pane is guided, and
    a closing mechanism for closing and opening the vehicle door, the closing mechanism having at least one supporting part and an exposed part, the exposed part located at least in part on an outside of the vehicle door, and the supporting part connected to and supporting the exposed part,
    wherein the window lifter and the closing mechanism are fixed on a supporting plate of the vehicle door,
    wherein the at least one supporting part of the closing mechanism is contacting and fixed relative to the guide rail, the guide rail consisting at least in part of plastics, and
    wherein the guide rail of the window lifter is slidably displaceable on the supporting plate between a first and an operating position.

* * * * *